United States Patent
Shibata

(10) Patent No.: US 12,123,107 B2
(45) Date of Patent: Oct. 22, 2024

(54) REVERSIBLY THERMOCHROMIC COMPOSITE FIBER

(71) Applicant: THE PILOT INK CO., LTD., Aichi-ken (JP)

(72) Inventor: Toshihiro Shibata, Aichi-ken (JP)

(73) Assignee: KABUSHIKI KAISHA PILOT CORPORATION, Tokyo-To (JP)

( * ) Notice: Subject to any disclaimer, the term of this patent is extended or adjusted under 35 U.S.C. 154(b) by 714 days.

(21) Appl. No.: 17/277,942

(22) PCT Filed: Sep. 12, 2019

(86) PCT No.: PCT/JP2019/035849
§ 371 (c)(1),
(2) Date: Mar. 19, 2021

(87) PCT Pub. No.: WO2020/066650
PCT Pub. Date: Apr. 2, 2020

(65) Prior Publication Data
US 2021/0355608 A1 Nov. 18, 2021

(30) Foreign Application Priority Data
Sep. 25, 2018 (JP) .................. 2018-178955

(51) Int. Cl.
*D01F 1/04* (2006.01)
*A41G 3/00* (2006.01)
(Continued)

(52) U.S. Cl.
CPC ............ *D01F 1/04* (2013.01); *A41G 3/0083* (2013.01); *A63H 9/00* (2013.01); *C08L 23/16* (2013.01);
(Continued)

(58) Field of Classification Search
CPC ..... D01F 1/04; D01F 1/07; D01F 8/06; D01F 8/04–18; A41G 3/0083
See application file for complete search history.

(56) References Cited

U.S. PATENT DOCUMENTS

| | | | | |
|---|---|---|---|---|
| 3,910,291 A | * | 10/1975 | Kim | A41G 3/0083 132/201 |
| 2002/0015847 A1 | * | 2/2002 | Shimizu | B32B 27/18 428/375 |
| 2019/0090565 A1 | * | 3/2019 | Miyata | D01F 8/12 |

FOREIGN PATENT DOCUMENTS

| | | |
|---|---|---|
| JP | 51-44706 | 11/1976 |
| JP | 51-44707 | 11/1976 |

(Continued)

OTHER PUBLICATIONS

"JP2002242017_Machine Translation" is a machine translation of JP-2002242017-A. (Year: 2002).*

(Continued)

*Primary Examiner* — Larissa Rowe Emrich
(74) *Attorney, Agent, or Firm* — Wenderoth, Lind & Ponack, L.L.P.

(57) ABSTRACT

To provide a reversibly thermochromic composite fiber having a reversible color change due to a temperature change, having such excellent flame retardancy that flame is hard to spread even if ignition occurs once, and having high safety.
[Solution] Disclosed is a sheath-core type reversibly thermochromic composite fiber including a core comprising a resin, a reversibly thermochromic pigment, and a flame retardant, and a sheath comprising a resin and a flame retardant.

8 Claims, 1 Drawing Sheet

(51) Int. Cl.
*A63H 9/00* (2006.01)
*C08L 23/16* (2006.01)
*C09K 9/02* (2006.01)
*C09K 21/04* (2006.01)
*D01F 1/07* (2006.01)
*D01F 8/06* (2006.01)
*A63H 3/02* (2006.01)
*A63H 3/44* (2006.01)

(52) U.S. Cl.
CPC ............... *C09K 9/02* (2013.01); *C09K 21/04* (2013.01); *D01F 1/07* (2013.01); *D01F 8/06* (2013.01); *A63H 3/02* (2013.01); *A63H 3/44* (2013.01); *C08L 2201/02* (2013.01); *C08L 2203/12* (2013.01); *D10B 2503/08* (2013.01)

(56) References Cited

FOREIGN PATENT DOCUMENTS

| | | |
|---|---|---|
| JP | 1-29398 | 6/1989 |
| JP | 4-17154 | 3/1992 |
| JP | 7-33997 | 2/1995 |
| JP | 7-179777 | 7/1995 |
| JP | 8-39936 | 2/1996 |
| JP | 11-129623 | 5/1999 |
| JP | 2001-105732 | 4/2001 |
| JP | 2002-129056 | 5/2002 |
| JP | 2002-242017 | 8/2002 |
| JP | 2002242017 A * | 8/2002 |
| JP | 2003-253149 | 9/2003 |
| JP | 2005-1369 | 1/2005 |
| JP | 2005-97751 | 4/2005 |
| JP | 2013-223575 | 10/2013 |
| KR | 10-2014-0120963 | 10/2014 |
| WO | 2017/187843 | 11/2017 |
| WO | WO-2017187843 A1 * | 11/2017 ............... A41G 3/00 |

OTHER PUBLICATIONS

International Search Report (ISR) Nov. 19, 2019 in International (PCT) Application No. PCT/JP2019/035849.
Office Action issued Apr. 25, 2023 in Japanese Patent Application No. 2020-548425, with English-language translation.
International Preliminary Report on Patentability and Written Opinion of the International Searching Authority issued Mar. 23, 2021 in International (PCT) Application No. PCT/JP2019/035849.

* cited by examiner

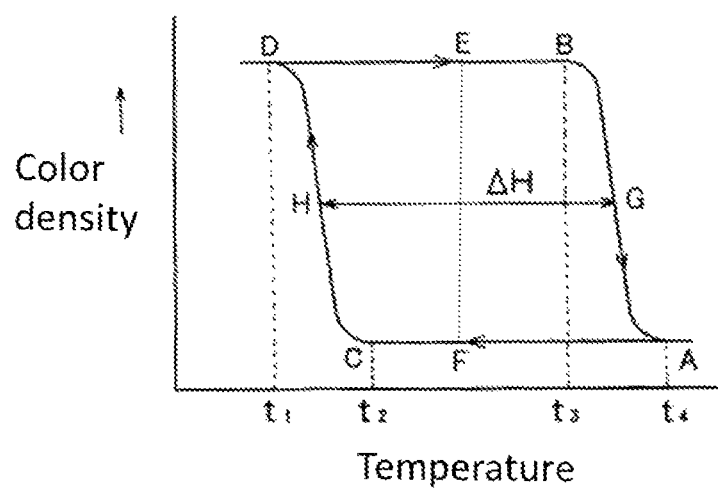

REVERSIBLY THERMOCHROMIC COMPOSITE FIBER

TECHNICAL FIELD

The present invention relates to a reversibly thermochromic composite fiber. More specifically, the present invention relates to a reversibly thermochromic composite fiber that reversibly changes color with a change in temperature.

BACKGROUND ART

Conventionally, a color interchangeable wig composed of a filament formed by dispersing a thermochromic pigment in a resin has been disclosed (see, for example, Patent Literature 1). In the filament, a flame retardant is contained in a multifilament or in a core of a sheath-core type composite fiber; however, in the case of the sheath-core type composite fiber, once a resin material constituting the core is ignited, flame tends to spread, and it has been difficult to impart desired flame retardancy.

In addition, composite fibers may be applied to doll hair and doll and human hair extensions. There is also a service to arrange the hairstyle of such a doll, which is one of the children's plays. In addition, children may use hair extensions to make their own hairstyles the same as the hairstyle of dolls, deepen their attachment, and play with the dolls. It is desirable that the fibers used for hair extensions that children attach to their hair have higher level of flame retardancy than the fibers used for doll hair.

CITATION LIST

Patent Literature

Patent Literature 1: JP 2002-242017A

SUMMARY OF INVENTION

Technical Problem

The present invention is intended to provide a reversibly thermochromic composite fiber having a reversible color change due to a temperature change and having excellent flame retardancy.

Solution to Problem

A sheath-core type reversibly thermochromic composite fiber according to the present invention includes
a core comprising a resin, a reversibly thermochromic pigment, and a flame retardant, and
a sheath comprising a resin and a flame retardant.
A head ornament according to the present invention includes the reversibly thermochromic composite fibers described above.
A toy according to the present invention includes the reversibly thermochromic composite fibers described above.

Advantageous Effects of Invention

The present invention can provide a reversibly thermochromic composite fiber having a reversible color change due to a temperature change and having excellent flame retardancy and high safety.

BRIEF DESCRIPTION OF DRAWINGS

FIG. 1 is a graph illustrating a discoloration behavior of a reversibly thermochromic pigment applied to the present invention.

DESCRIPTION OF EMBODIMENTS

A reversibly thermochromic composite fiber (hereinafter may be referred to as a composite fiber) according to the present invention is
a sheath-core type reversibly thermochromic composite fiber including
a core comprising a resin, a reversibly thermochromic pigment, and a flame retardant, and
a sheath comprising a resin and a flame retardant.

In the present invention, the core comprises a reversibly thermochromic pigment, mainly keeps a form as a fiber and further plays a role of developing or discoloring the fiber, and the sheath mainly protects the core and plays a role of giving the fiber strength.

In the present invention, the sheath-core type refers to a structure in which a part or the entirety of an outer periphery of the core is covered with the sheath, and the entire outer periphery is preferably covered. When a cross section of the composite fiber is observed, the core and the sheath do not necessarily have to be arranged concentrically. Examples of the cross-sectional shape include circle, ellipse, trilobal, polygons such as triangle, quadrangle, pentagon, and star, and from the viewpoint of spinnability and workability, the cross-sectional shape is preferably circular. By using a sheath-core type composite fiber, durability such as light fastness, washing fastness, and friction fastness, and glossiness can be improved.

An average outer diameter of the composite fiber is preferably in a range of 10 to 300 μm, and if the outer diameter is less than 10 μm, it is difficult to increase an amount of the reversibly thermochromic pigment mixed with a resin of the core, and visibility of a color change is likely to be impaired.

On the other hand, if the outer diameter exceeds 300 μm, flexibility as a fiber is likely to be impaired. More preferably, an average outer diameter of the composite fiber is 50 to 150 μm.

An area ratio of the core: the sheath in the cross section of the composite fiber according to the present invention is preferably 4:6 to 7:3. When the area ratio is within the above range, it is possible to construct a composite fiber that is excellent in the visibility of the color change and density and has desired flame retardancy. More preferably, the area ratio of the core: the sheath is 5:5 to 6:4.

The above-mentioned outer diameter and cross-sectional area can be calculated by, for example, image analysis software or a planimeter based on a cross-sectional photograph taken by an optical microscope or an electron microscope. When the cross-sectional shape of the fiber is not circular, a diameter of a circle is the outer diameter when the cross-sectional area is an area of the circle. The average outer diameter corresponds to an average of the outer diameters at a plurality of locations of a single fiber. Although the composite fiber is generally produced by melt spinning, a composite fiber having a desired outer diameter or average outer diameter can be obtained by appropriately adjusting conditions such as temperature and speed in a step of drawing a resin extruded from a spinneret of a composite fiber spinning apparatus.

An average length of the composite fiber is not particularly limited, and is preferably 5 to 600 mm, and more preferably 10 to 450 mm.

The resin comprised in the core and the resin comprised in the sheath, which constitute the composite fiber according to the present invention, are thermoplastic resins, and examples of the thermoplastic resins include polyolefin-based resins such as low-density polyethylene, linear low-density polyethylene, highdensity polyethylene, polypropylene, polypropylene-ethylene copolymer, polyisobutylene, polybutadiene, and ethylene-propylene rubber, polyamide resins such as 6 nylon, 6,6 nylon, 6,9 nylon, 6,10 nylon, 11 nylon, 12 nylon, 6-12 copolymer nylon, 6,9-12 copolymer nylon, and polyamide elastomers, polyester-based resins such as polyhexametylene terephthalates, polyethylene terephthalates, polybutylene terephthalates, saturated aliphatic polyesters, and polyester elastomers, and vinylidene chloride resins. Among these resins, polyolefin-based resins are preferably used from the viewpoint of cost and spinnability. Although different resins may be used for the core and the sheath, it is preferable to use the same resin in order to have excellent adhesion between the core and the sheath and prevent peeling.

Examples of the reversibly thermochromic pigment include (a) an electron-donating color-developing organic compound, (b) an electron-accepting compound, (c) a reversibly thermochromic microcapsule pigment obtained by encapsulating, in a microcapsule, a reversibly thermochromic composition composed of a reaction medium to determine an occurrence temperature of a coloring reaction of the component (a) and the component (b), and reversibly thermochromic resin particles in which the reversibly thermochromic composition is dispersed in a thermoplastic or thermosetting resin.

As the reversibly thermochromic composition, it is possible to use a reversibly thermochromic composition described in JP S51-44706B, JP S51-44707B, JP H1-29398B, etc. and being of heat-decoloring type (decolored when heated, and colored when cooled) which changes color above and below a predetermined temperature (color changing point), exhibits a decolored state in a temperature range not lower than an upper color changing point, exhibits a colored state in a temperature range not higher than a lower color changing point, and has characteristics in which only one specific state, of the both states, exists in a normal temperature range, and the other state is maintained only while heat or cold required for the other state to be expressed is being applied, but the state in the normal temperature range is restored once the application of heat or cold is terminated and in which a hysteresis width (ΔH) is relatively small (ΔH=1 to 7° C.).

Also, it is possible to use a reversibly thermochromic composition described in JP H4-17154B, JP H7-179777A, JP H7-33997A, JP H8-39936, JP 2005-1369, etc. and being of heat-decoloring type (decolored when heated, and colored when cooled) which exhibits a characteristic of large hysteresis (ΔH=8 to 70° C.), changes the color along very different paths in the curve of plots showing color density change with temperature change between when the temperature increases from a region lower than the discoloration range and when the temperature decreases from a region higher than the discoloration range, and has color memorability capable of maintaining a colored state in a low temperature range or a decolored state in a high temperature range in the specific temperature range (see FIG. 1)

Hysteresis characteristics of a reversibly thermochromic composition in a color density-temperature curve will be described.

In FIG. 1, the color density is plotted on the ordinate and the temperature is plotted on the abscissa. A change in the color density due to temperature change proceeds along the arrow. Here, A is a point showing the density at a temperature $t_4$ at which a completely decolored state is achieved (hereinafter referred to as complete decoloring temperature); B is a point showing the density at a temperature $t_3$ at which decoloring starts (hereinafter referred to as decoloring starting temperature); C is a point showing the density at a temperature $t_2$ at which coloring starts (hereinafter referred to as coloring starting temperature); and D is a point showing the density at a temperature $t_1$ at which a completely colored state is achieved (hereinafter referred to as complete coloring temperature).

The discoloration temperature range is a temperature range between $t_1$ and $t_4$ where a colored state or a decolored state can be provided, and a temperature range between $t_2$ and $t_3$ where difference in color density is large is an essentially discoloration temperature range.

Also, the length of the line segment EF is a measure showing contrast of discoloration, and the length of the line segment HG passing through the midpoint of the line segment EF is a temperature width showing the degree of hysteresis (hereinafter referred to as hysteresis width ΔH). When this ΔH value is small, only specified state of both states before and after discoloration can exist in the ordinary temperature region. When the ΔH value is large, it is easy to keep each state before and after discoloration.

Specific compounds to be used as the respective components (a), (b), and (c) will be exemplified below.

The component (a) of the present invention, namely, an electron-donating color-developing organic compound, is a color-determining component which develops a color by donating an electron(s) to the component (b), which is a color developer.

Examples of the electron-donating color-developing organic compound include phthalide compounds, fluoran compounds, styrynoquinoline compounds, diazarhodamine lactone compounds, pyridine compounds, quinazoline compounds, and bisquinazoline compounds, among which phthalide compounds and fluoran compounds are preferred.

Examples of the phthalide compounds include diphenylmethane phthalide compounds, phenylindolyl phthalide compounds, indolyl phthalide compounds, diphenylmethane azaphthalide compounds, phenylindolyl azaphthalide compounds, and derivatives of these compounds, among which phenylindolyl azaphthalide compounds and their derivatives are preferred.

Examples of the fluoran compounds include aminofluoran compounds, alkoxyfluoran compounds, and derivatives of these compounds.

Examples of these compounds are shown below.

3,3-bis(p-dimethylaminophenyl)-6-dimethylaminophthalide, 3-(4-diethylaminophenyl)-3-(1-ethyl-2-methylindol-3-yl) phthalide, 3,3-bis(1-n-butyl-2-methylindol-3-yl)phthalide, 3,3-bis(2-ethoxy-4-d iethylaminophenyl)-4-azaphthalide, 3-(2-ethoxy-4-diethylaminophenyl)-3-(1-ethyl-2-methylindol-3-yl)-4-azaphthalide, 3-(2-hexyloxy-4-diethylaminophenyl)-3-(1-ethyl-2-methylindol-3-yl)-4-azaphthalide, 3-[2-ethoxy-4-(N-ethylanilino)phenyl]-3-(1-ethyl-2-methylindol-3-yl)-4-azaphthalide, 3-(2-acetamido-4-diethylaminophenyl)-3-(1-propylindol-3-yl)-4-azaphthalide, 3,6-bis (diphenylamino)fluoran, 3,6-dimethoxyfluoran, 3,6-di-n-butoxyfluoran, 2-methyl-6-(N-ethyl-N-p-tolylamino) fluoran, 3-chloro-6-cyclohexylaminofluoran, 2-methyl-6-cyclohexylaminofluoran, 2-(2-chloroamino)-6-di-n-butylaminofluoran, 2-(2-chloroanilino)-6-d i-n-butylaminofluoran, 2-(3-trifluoromethylanilino)-6-diethylaminofluoran, 2-(3-trifluoromethylanilino)-6-dipentylaminofluoran, 2-dibenzylamino-6-diethylaminofluoran, 2-N-methylanilino-6-(N-ethyl-N-p-tolylamino)fluoran, 1,3-dimethyl-6-diethylaminofluoran, 2-chloro-3-methyl-6-diethylaminofluoran, 2-anilino-3-methyl-6-diethylaminofluoran, 2-anilino-3-methoxy-6-diethylaminofluoran, 2-anilino-3-methyl-6-di-n-butylaminofluoran, 2-anilino-3-methoxy-6-d i-n-butylaminofluoran, 2-xylidino-3-methyl-6-diethylaminofluoran, 2-anilino-3-methyl-6-(N-ethyl-N-p-tolylamino)fluoran, 1,2-benz-6-diethylaminofluoran, 1,2-benz-6-(N-ethyl-N-isobutylamino) fluoran, 1,2-benz-6-(N-ethyl-N-isoamylamino)fluoran, 2-(3-methoxy-4-dodecoxystyryl)quinoline, 2-diethylamino-8-diethylamino-4-methylspiro[5H-[1]benzopyrano[2,3-d] pyrimidine-5,1'(3'H)isobenzofuran]-3'-one, 2-di-n-butylamino-8-di-n-butylamino-4-methylspiro[5H-[1] benzopyrano[2,3-d]pyrinnidine-5,1'(3'H)isobenzofuran]-3'-one, 2-di-n-butylannino-8-diethylannino-4-methylspiro[5H-[1]benzopyrano[2,3-d]pyrinnidine-5,V(3'H)isobenzofuran]-3'-one, 2-di-n-butylannino-8-(N-ethyl-N-isoamylamino)-4-methylspiro[5H-Mbenzopyrano[2,3-d]pyrimidine-5,1'(3'H) isobenzofuran]-3'-one, 2-di-n-butylamino-8-di-n-pentylamino-4-methylspiro [5H-[1]benzopyrano[2,3-d]pyrinnidine-5,1'(3'H)isobenzofuran]-3'-one, 4,5,6,7-tetrachloro-3-(4-d imethylamino-2-methoxyphenyl)-3-(1-butyl-2-methyl-1 H-indol-3-yl)-1(3H)-isobenzofuranone, 4,5,6,7-tetrachloro-3-(4-diethylannino-2-ethoxyphenyl)-3-(1-ethyl-2-methyl-1H-indol-3-yl)-1(3H)-isobenzofuranone, 4,5,6,7-tetrachloro-3-(4-diethylannino-2-ethoxyphenyl)-3-(1-pentyl-2-methyl-1H-indol-3-yl)-1(3H)-isobenzofuranone, 4,5,6,7-tetrachloro-3-(4-diethylannino-2-methylphenyl)-3-(1-ethyl-2-methyl-1H-indol-3-yl)-1(3H)-isobenzofuranone, 3',6'-bis[phenyl(2-methylphenyl)amino]-spiro[isobenzofuran-1(3H),9'-[9H]xanthen]-3-one, 3',6'-bis[phenyl(3-methylphenyl)amino]-spiro[isobenzofuran-1(3H),9'-[9H]xanthene]-3-one, 3',6'-bis[phenyl(3-ethylphenyl)amino]-spiro[isobenzofuran-1(3H),9'-[9H]xanthene]-3-one, 2,6-bis(2'-ethyloxyphenyl)-4-(4'-dimethylaminophenyl) pyridine, 2,6-bis(2',4'-diethyloxyphenyl)-4-(4'-dimethylaminophenyl)pyridine, 2-(4'-dimethylaminophenyl)-4-methoxyquinazoline, and 4,4'-ethylenedioxy-bis[2-(4-diethylaminophenyl)quinazoline] are included in the examples.

The fluorans may be compounds which contain a substituent in a xanthene ring-forming phenyl group, and in addition, may also be compounds which have a blue or black color and which contain a substituent in a xanthene ring-forming phenyl group as well as in a lactone ring-forming phenyl group (these substituents may be, for example, an alkyl group such as a methyl group or a halogen atom such as a chlorine atom).

The component (b), namely an electron-accepting compound, is a compound which receives an electron(s) from the component (a) and functions as a color developer of the component (a).

Examples of the electron-accepting compound include active proton-containing compounds and derivatives thereof; pseudo-acidic compounds [compounds which are not acids but each act as an acid in a composition to cause the component (a) to develop a color]; and compounds with electron vacancies. Among these, the component (b) is preferably a compound selected from active proton-containing compounds.

Examples of the active proton-containing compounds and derivatives thereof include phenolic hydroxyl group-containing compounds and metal salts thereof; carboxylic acids and metal salts thereof, preferably aromatic carboxylic acids, aliphatic carboxylic acids having 2 to 5 carbon atoms, and metal salts thereof; acidic phosphoric acid esters and metal salts thereof; as well as azole-based compounds and derivatives thereof, and 1,2,3-triazole and derivatives thereof. Among these, phenolic hydroxyl group-containing compounds are preferred since they can allow an effective discoloration characteristic to be expressed.

The phenolic hydroxyl group-containing compounds include a wide range of compounds, ranging from monophenol compounds to polyphenol compounds, and bis-type and tris-type phenols, phenol-aldehyde condensation resins and the like are also included therein. Among the phenolic hydroxyl group-containing compounds, those which contain at least two benzene rings are preferred. Further, these compounds may also have a substituent, examples of which include an alkyl group, an aryl group, an acyl group, an alkoxycarbonyl group, a carboxy group, and an ester thereof, as well as an amide group and a halogen atom.

Examples of the metal comprised in the metal salts of the active proton-containing compounds include sodium, potassium, calcium, zinc, zirconium, aluminum, magnesium, nickel, cobalt, tin, copper, iron, vanadium, titanium, lead, and molybdenum.

Specific examples of the component (b) are given below.

Phenol, o-cresol, tert-butyl catechol, nonylphenol, n-octylphenol, n-dodecylphenol, n-stearylphenol, p-chlorophenol, p-bromophenol, o-phenylphenol, n-butyl p-hydroxybenzoate, n-octyl p-hydroxybenzoate, resorcin, dodecyl gallate, 4,4-dihydroxydiphenylsulfone, bis(4-hydroxyphenyl)sulfide, 1,1-bis(4-hydroxyphenyl)ethane, 1,1-bis(4-hydroxyphenyl)propane, 1,1-bis(4-hydroxyphenyl)n-butane, 1,1-bis(4-hydroxyphenyl)n-pentane, 1,1-bis(4-hydroxyphenyl)n-hexane, 1,1-bis(4-hydroxyphenyl)n-heptane, 1,1-bis (4-hydroxyphenyl)n-octane, 1,1-bis(4-hydroxyphenyl)n-nonane, 1,1-bis(4-hydroxyphenyl)n-decane, 1,1-bis(4-hydroxyphenyl)n-dodecane, 1,1-bis(4-hydroxyphenyl)-2-methylpropane, 1,1-bis(4-hydroxyphenyl)-3-methylbutane, 1,1-bis(4-hydroxyphenyl)-3-methylpentane, 1,1-bis(4-hydroxyphenyl)-2,3-dimethylpentane, 1,1-bis(4-hydroxyphenyl)-2-ethylbutane, 1,1-bis(4-hydroxyphenyl)-2-ethylhexane, 1,1-bis(4-hydroxyphenyl)-3,7-dimethyloctane, 1,1-bis(4-hydroxyphenyl)cyclohexane, 1,1-bis(4-hydroxyphenyl)-3,3,5-trimethylcyclohexane, 1-phenyl-1,1-bis(4-hydroxyphenyl)ethane, 2,2-bis(4-hydroxyphenyl) propane, 2,2-bis(4-hydroxyphenyl)n-butane, 2,2-bis(4-hydroxyphenyl)n-pentane, 2,2-bis(4-hydroxyphenyl)n-hexane, 2,2-bis(4-hydroxyphenyl)n-heptan, 2,2-bis(4-hydroxyphenyl)n-octane, 2,2-bis(4-hydroxyphenyl)n-nonane, 2,2-bis(4-hydroxyphenyl)n-decane, 2,2-bis(4-hydroxyphenyl)n-dodecane, 2,2-bis(4-hydroxyphenyl)ethyl propionate, 2,2-bis(4-hydroxyphenyl)-4-methylpentane, 2,2-bis(4-hydroxyphenyl)-4-methylhexane, 2,2-bis(4-hydroxyphenyl)hexafluoropropane, 2,2-bis(4-hydroxy-3-methylphenyl)propane, 9,9-bis(4-hydroxy-3-methylphenyl)fluorene, 1,1-bis[2-(4-hydroxyphenyl)-2-propyl]benzene, bis(2-hydroxyphenyl)methane, 1,1,1-tris(4-hydroxyphenyl)ethane, and 3,3-bis(3-methyl-4-hydroxyphenyl)butane are included in the examples.

Although the compounds having phenolic hydroxyl groups can develop the thermochromic properties most effectively, it is also possible to use compounds selected from the group consisting of aromatic carboxylic acids, aliphatic carboxylic acids having 2 to 5 carbon atoms, metal salts of carboxylic acids, acidic phosphoric esters and metal salts thereof, and 1,2,3-triazole and derivatives thereof.

The component (c) of the reaction medium which reversibly induces an electron transfer reaction between the component (a) and the component (b) in a specific temperature range will be described.

Examples of the component (c) include alcohols, esters, ketones, ethers, and acid amides.

In addition, in order to exhibit a characteristic of large hysteresis with respect to a color density-temperature curve to change color and provide color memorability depending on a temperature change, a carboxylic ester compound exhibiting a ΔT value (melting point—cloudy point) of 5° C. or higher and less than 50° C. described in JP 4-17154 B is mentioned. Examples thereof include a carboxylic acid ester having a substituted aromatic ring in the molecule, an ester of a carboxylic acid having an unsubstituted aromatic ring and an aliphatic alcohol having 10 or more carbon atoms, a carboxylic acid ester having a cyclohexyl group in the molecule, an ester of a fatty acid having 6 or more carbon atoms and an unsubstituted aromatic alcohol or a phenol, a fatty acid having 8 or more carbon atoms and a branched aliphatic alcohol or ester, an ester of dicarboxylic acid and an aromatic alcohol or a branched aliphatic alcohol, dibenzyl cinnamate, heptyl stearate, didecyl adipate, dilauryl adipate, dimyristyl adipate, dicetyl adipate, distearyl adipated, Trilaurin, Trimyristin, Tristearin, Dimyristin, and Distearin.

A fatty acid ester compound obtained from an aliphatic monohydric alcohol having an odd number not less than 9 of carbon atoms, and an aliphatic carboxylic acid having an even number of carbon atoms, and a fatty acid ester compound with a total carbon number of 17 to 23 to be obtained from n-pentyl alcohol or n-heptyl alcohol and an aliphatic carboxylic acid having an even number from 10 to 16 of carbon atoms, are also effective.

Specific examples thereof include n-pentadecyl acetate, n-tridecyl butyrate, n-pentadecyl butyrate, n-undecyl caproate, n-tridecyl caproate, n-pentadecyl caproate, n-nonyl caprylate, n-undecyl caprylate, n-tridecyl caprylate, n-pentadecyl caprylate, n-heptyl caprate, n-nonyl caprate, n-undecyl caprate, n-tridecyl caprate, n-pentadecyl caprate, n-pentyl laurate, n-heptyl laurate, n-nonyl laurate, n-undecyl laurate, n-tridecyl laurate, n-pentadecyl laurate, n-pentyl myristate, n-heptyl myristate, n-nonyl myristate, n-undecyl myristate, n-tridecyl myristate, n-pentadecyl myristate, n-pentyl palmitate, n-heptyl palmitate, n-nonyl palmitate, n-undecyl palmitate, n-tridecyl palmitate, n-pentadecyl palmitate, n-nonyl stearate, n-undecyl stearate, n-tridecyl stearate, n-pentadecyl stearate, n-nonyl eicosanoate, n-undecyl eicosanoate, n-tridecyl eicosanoate, n-pentadecyl eicosanoate, n-nonyl behenate, n-undecyl behenate, n-tridecyl behenate, and n-pentadecyl behenate.

As the ketones, aliphatic ketones with a total carbon number of 10 or more are effectively employed. Examples thereof include 2-decanone, 3-decanone, 4-decanone, 2-undecanone, 3-undecanone, 4-undecanone, 5-undecanone, 2-dodecanone, 3-dodecanone, 4-dodecanone, 5-dodecanone, 2-tridecanone, 3-tridecanone, 2-tetradecanone, 2-pentadecanone, 8-pentadecanone, 2-hexadecanone, 3-hexadecanone, 9-heptadecanone, 2-pentadecanone, 2-octadecanone, 2-nonadecanone, 10-nonadecanone, 2-eicosanone, 11-eicosanone, 2-heneicosanone, 2-docosanone, laurone, and stearone.

Furthermore, examples thereof include aryl alkyl ketones with a total carbon number of 12 to 24 such as n-octadecanophenone, n-heptadecanophenone, n-hexadecanophenone, n-pentadecanophenone, n-tetradecanophenone, 4-n-dodecaacetophenone, n-tridecanophenone, 4-n-undecanoacetophenone, n-laurophenone, 4-n-decanoacetophenone, n-undecanophenone, 4-n-nonylacetophenone, n-decanophenone, 4-n-octylacetophenone, n-nonanophenone, 4-n-heptylacetophenone, n-octanophenone, 4-n-hexylacetophenone, 4-n-cyclohexylacetophenone, 4-tert-butylpropiophenone, n-heptaphenone, 4-n-pentylacetophenone, cyclohexyl phenyl ketone, benzyl n-butyl ketone, 4-n-butylacetophenone, n-hexanophenone, 4-isobutylacetophenone, 1-acetonaphthone, 2-acetonaphthone, and cyclopentyl phenyl ketone.

As the ethers, aliphatic ethers with a total carbon number of 10 or more are effectively employed. Examples thereof include dipentyl ether, dihexyl ether, diheptyl ether, dioctyl ether, dinonyl ether, didecyl ether, diundecyl ether, didodecyl ether, ditridecyl ether, ditetradecyl ether, dipentadecyl ether, dihexadecyl ether, dioctadecyl ether, decanediol dimethyl ether, undecanediol dimethyl ether, dodecanediol dimethyl ether, tridecanediol dimethyl ether, decanediol diethyl ether, and undecanediol diethyl ether.

Examples of the acid amides include acetamide, propionic acid amide, butyric acid amide, caproic acid amide, caprylic acid amide, capric acid amide, lauric acid amide, myristic acid amide, palmitic acid amide, stearic acid amide, behenic acid amide, oleic acid amide, erucic acid amide, benzamide, caproic acid anilide, caprylic acid anilide, capric acid anilide, lauric acid anilide, myristic acid anilide, palmitic acid anilide, stearic acid anilide, behenic acid anilide, oleic acid anilide, erucic acid anilide, N-methylcaproic acid amide, N-methylcaprylic acid amide, N-methylcapric acid amide, N-methyllauric acid amide, N-methylmyristic acid amide, N-methylpalmitic acid amide, N-methylstearic acid amide, N-methylbehenic acid amide, N-methyloleic acid amide, N-methylerucic acid amide, N-ethyllauric acid amide, N-ethylmyristic acid amide, N-ethylpalmitic acid amide, N-ethylstearic acid amide, N-ethyloleic acid amide, N-butyllauric acid amide, N-butylmyristic acid amide, N-butylpalmitic acid amide, N-butylstearic acid amide, N-butyloleic acid amide, N-octyllauric acid amide, N-octylmyristic acid amide, N-octylpalmitic acid amide, N-octylstearic acid amide, N-octyloleic acid amide, N-dodecyllauric acid amide, N-dodecylmyristic acid amide, N-dodecylpalmitic acid amide, N-dodecylstearic acid amide, N-dodecyloleic acid amide, dilauric acid amide, dimyristic acid amide, dipalmitic acid amide, distearic acid amide, dioleic acid amide, trilauric acid amide, trimyristic acid amide, tripalmitic acid amide, tristearic acid amide, trioleic acid amide, succinic acid amide, adipic acid amide, glutaric acid amide, malonic acid amide, azelaic acid amide, maleic acid amide, N-methylsuccinic acid amide, N-methyladipic acid amide, N-methylglutaric acid amide, N-methylmalonic acid amide, N-methylazelaic acid amide, N-ethylsuccinic acid amide, N-ethyladipic acid amide, N-ethylglutaric acid amide, N-ethylmalonic acid amide, N-ethylazelaic acid amide, N-butylsuccinic acid amide, N-butyladipic acid amide, N-butylglutaric acid amide, N-butylmalonic acid amide, N-octyladipic acid amide and N-dodecyladipic acid amide.

As the component (c), a compound expressed by the following Formula (1) may be used:

[Chem. 1]

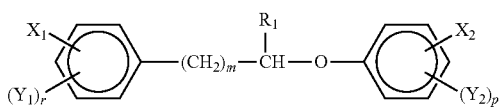

(1)

(wherein $R_1$ represents a hydrogen atom, or a methyl group, m represents an integer of 0 to 2, one of $X_1$ and $X_2$ represents $-(CH_2)_nOCOR_2$ or $-(CH_2)_nCOOR_2$, the other represents a hydrogen atom; n represents an integer of 0 to 2; $R_2$ represents an alkyl or alkenyl group having 4 or more carbon atoms, $Y_1$ and $Y_2$ independently represent a hydrogen atom, an alkyl group having 1 to 4 carbon atoms, a methoxy group, or a halogen, and r and p independently represent an integer of 1 to 3.)

Among compounds represented by the Formula (1), those in which $R_1$ is a hydrogen atom are suitable, because a reversibly thermochromic composition with a wider hysteresis width is obtainable, and those in which $R_1$ is a hydrogen atom and m is 0 are more suitable.

Among the compounds represented by the Formula (1), compounds represented by the following Formula (2) are used more preferably:

[Chem. 2]

(2)

wherein R is an alkyl or alkenyl group having 8 or more carbon atoms, preferably an alkyl group having 10 to 24 carbon atoms, and more preferably an alkyl group having 12 to 22 carbon atoms.

Specific examples of the compound represented by the Formula (2) include 4-benzyloxyphenylethyl octanoate, 4-benzyloxyphenylethyl nonanoate, 4-benzyloxyphenylethyl decanoate, 4-benzyloxyphenylethyl undecanoate, 4-benzyloxyphenylethyl dodecanoate, 4-benzyloxyphenylethyl tridecanoate, 4-benzyloxyphenylethyl tetradecanoate, 4-benzyloxyphenylethyl pentadecanoate, 4-benzyloxyphenylethyl hexadecanoate, 4-benzyloxyphenylethyl heptadecanoate, and 4-benzyloxyphenylethyl octadecanoate.

Further, as the component (c), a compound represented by the following Formula (3) may be used:

[Chem. 3]

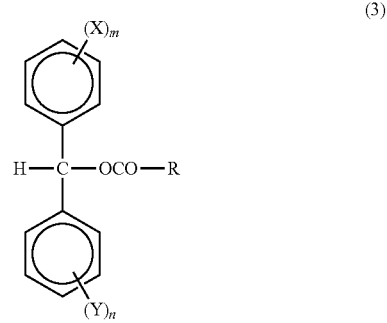

(3)

(wherein R represents an alkyl or alkenyl group having 8 or more carbon atoms, m and n independently represent an integer of 1 to 3, and each X and Y independently represent a hydrogen atom, an alkyl group having 1 to 4 carbon atoms, an alkoxy group having 1 to 4 carbon atoms, or a halogen atom.)

Specific examples of the compound represented by the Formula (3) include 1,1-diphenylmethyl octanoate, 1,1-diphenylmethyl nonanoate, 1,1-diphenylmethyl decanoate, 1,1-diphenylmethyl undecanoate, 1,1-diphenylmethyl dodecanoate, 1,1-diphenylmethyl tridecanoate, 1,1-diphenylmethyl tetradecanoate, 1,1-diphenylmethyl pentadecanoate, 1,1-diphenylmethyl hexadecanoate, 1,1-diphenylmethyl heptadecanoate, or 1,1-diphenylmethyl octadecanoate.

Furthermore, as the component (c), a compound represented by the following Formula (4) may be used:

[Chem. 4]

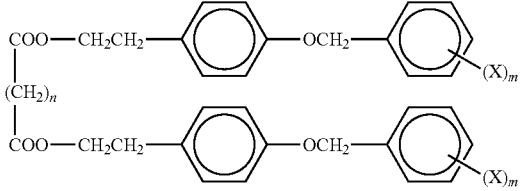

(4)

(wherein X represents a hydrogen atom, an alkyl group having 1 to 4 carbon atoms, a methoxy group, or a halogen atom, m represents an integer of 1 to 3, and n represents an integer of 1 to 20.)

Examples of the compound represented by the Formula (4) include diester of malonic acid with 2-[4-(4-chlorobenzyloxy)phenyl]ethanol, diester of succinic acid with 2-(4-benzyloxyphenyl)ethanol, diester of succinic acid with 2-[4-(3-methylbenzyloxy)phenyl]ethanol, diester of glutaric acid with 2-(4-benzyloxyphenyl)ethanol, diester of glutaric acid with 2-[4-(4-chlorobenzyloxy)phenyl]ethanol, diester of adipic acid with 2-(4-benzyloxyphenyl)ethanol, diester of pimelic acid with 2-(4-benzyloxyphenyl)ethanol, diester of suberic acid with 2-(4-benzyloxyphenyl)ethanol, diester of suberic acid with 2-[4-(3-methylbenzyloxy)phenyl]ethanol, diester of suberic acid with 2-[4-(4-chlorobenzyloxy)phenyl]ethanol, diester of suberic acid with 2-[4-(2,4-dichlorobenzyloxy)phenyl]ethanol, diester of azelaic acid with 2-(4-benzyloxyphenyl)ethanol, diester of sebacic acid with 2-(4-benzyloxyphenyl)ethanol, diester of 1,10-decanedicarboxylic acid with 2-(4-benzyloxyphenyl)ethanol, diester of 1,18-octadecanedicarboxylic acid with 2-(4-benzyloxyphenyl)ethanol, and diester of 1,18-octadecane-dicarboxylic acid with 2-[4-(2-methyl benzyloxy)phenyl]ethanol.

Further, as the component (c), a compound represented by the following Formula (5) may be used:

[Chem. 5]

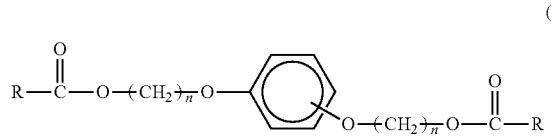

(5)

(wherein R represents an alkyl or alkenyl group having 1 to 21 carbon atoms, and n represents an integer of 1 to 3.)

Examples of the compound represented by the Formula (5) include diester of capric acid with 1,3-bis(2-hydroxyethoxy)benzene, diester of undecanoic acid with 1,3-bis(2-hydroxyethoxy)benzene, diester of lauric acid with 1,3-bis(2-hydroxyethoxy)benzene, diester of myristic acid with 1,3-bis(2-hydroxyethoxy)benzene, diester of butyric acid with 1,4-bis(hydroxymethoxy)benzene, diester of isovaleric acid with 1,4-bis(hydroxymethoxy)benzene, diester of acetic acid with 1,4-bis(2-hydroxyethoxy)benzene, diester of propionic acid with 1,4-bis(2-hydroxyethoxy)benzene, diester of valeric acid with 1,4-bis(2-hydroxyethoxy)benzene, diester of caproic acid with 1,4-bis(2-hydroxyethoxy)benzene, diester of carpylic acid with 1,4-bis(2-hydroxyethoxy)benzene, diester of capric acid with 1,4-bis(2-hydroxyethoxy)benzene, diester of lauric acid with 1,4-bis(2-hydroxyethoxy)benzene, and diester of myristic acid with 1,4-bis(2-hydroxyethoxy)benzene.

Furthermore, as the component (c), a compound represented by the following Formula (6) may be used:

[Chem. 6]

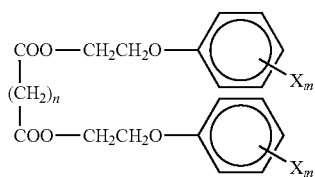

(6)

(wherein X represents a hydrogen atom, an alkyl group having 1 to 4 carbon atoms, an alkoxy group having 1 to 4 carbon atoms, or a halogen atom, m represents an integer of 1 to 3, and n represents an integer of 1 to 20.)

Examples of the compound represented by the Formula (6) include diester of succinic acid with 2-phenoxyethanol, diester of suberic acid with 2-phenoxyethanol, diester of sebacic acid with 2-phenoxyethanol, diester of 1,10-decanedicarboxylic acid with 2-phenoxyethanol, or diester of 1,18-octadecanedicarboxylic acid with 2-phenoxyethanol.

Further, as the component (c), a compound represented by the following Formula (7) may be used:

[Chem. 7]

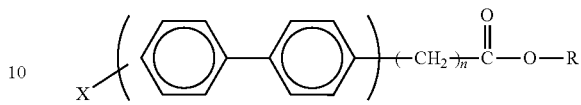

(7)

(wherein R represents an alkyl group having 4 to 22 carbon atoms, a cycloalkyl alkyl group, a cycloalkyl group, or an alkenyl group having 4 to 22 carbon atoms, X represents a hydrogen atom, an alkyl group having 1 to 4 carbon atoms, an alkoxy group having 1 to 4 carbon atoms, or a halogen atom, and n represents 0 or 1.)

Examples of the compound represented by the Formula (7) include decyl 4-phenylbenzoate, lauryl 4-phenylbenzoate, myristyl 4-phenylbenzoate, cyclohexylethyl 4-phenylbenzoate, octyl 4-biphenylacetate, nonyl 4-biphenylacetate, decyl 4-biphenylacetate, lauryl 4-biphenylacetate, myristyl 4-biphenylacetate, tridecyl 4-biphenylacetate, pentadecyl 4-biphenylacetate, cetyl 4-biphenylacetate, cyclopentyl 4-biphenylacetate, cyclohexylmethyl 4-biphenylacetate, hexyl 4-biphenylacetate, and cyclohexylmethyl 4-biphenylacetate.

Furthermore, as the component (c), a compound represebted by the following Formula (8) may be used:

[Chem. 8]

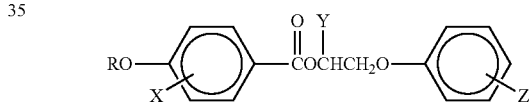

(8)

(wherein R represents an alkyl group having 3 to 18 carbon atoms or an aliphatic acyl group having 3 to 18 carbon atoms, X represents a hydrogen atom, an alkyl group having 1 to 3 carbon atoms, an alkoxy group having 1 or 2 carbon atoms, or a halogen atom, Y represents a hydrogen atom or a methyl group, and Z represents a hydrogen atom, an alkyl group having 1 to 4 carbon atoms, an alkoxy group having 1 or 2 carbon atoms, or a halogen atom.)

Examples of the compound represented by the Formula (8) include phenoxyethyl 4-butoxybenzoate, phenoxyethyl 4-pentyloxybenzoate, phenoxyethyl 4-tetradecyloxybenzoate, an ester of phenoxyethyl 4-hydroxybenzoate and dodecanoic acid, and a dodecyl ether of phenoxyethyl vanilliate.

Further, as the component (c), a compound represented by the followina Formula (9) may be used:

[Chem. 9]

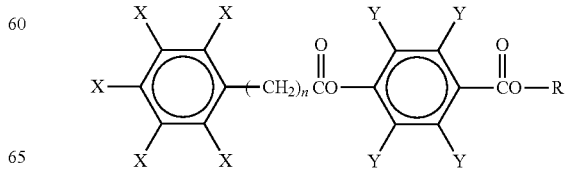

(9)

(wherein R represents an alkyl group having 4 to 22 carbon atoms, an alkenyl group having 4 to 22 carbon atoms, a cycloalkyl alkyl group, or a cycloalkyl group, X represents a hydrogen atom, an alkyl group, an alkoxy group, or a halogen atom, Y represents a hydrogen atom, an alkyl group, an alkoxy group or a halogen atom, and n represents 0 or 1.)

Examples of the compound represented by the Formula (9) include a benzoic acid ester of octyl p-hydroxybenzoate, a benzoic acid ester of decyl p-hydroxybenzoate, a p-methoxybenzoic acid ester of heptyl p-hydroxybenzoate, an o-methoxybenzoic acid ester of dodecyl p-hydroxybenzoate, and a benzoic ester of cyclohexylmethyl p-hydroxybenzoate.

Furthermore, as the component (c), a compound represented by the following Formula (10) may be used:

[Chem. 10]

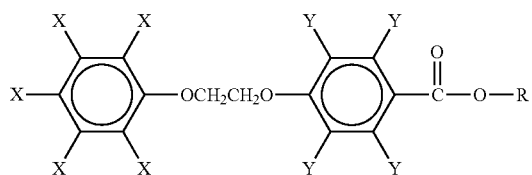

(10)

(wherein R represents an alkyl group having 3 to 18 carbon atoms, a cycloalkyl alkyl group having 6 to 11 carbon atoms, a cycloalkyl group having 5 to 7 carbon atoms, or an alkenyl group having 3 to 18 carbon atoms, X represents a hydrogen atom, an alkyl group having 1 to 4 carbon atoms, an alkoxy group having 1 to 3 carbon atoms, or a halogen atom, and Y represents a hydrogen atom, an alkyl group having 1 to 4 carbon atoms, a methoxy group, an ethoxy group or a halogen atom.)

Examples of the compound represented by the Formula (10) include phenoxyethyl ether of nonyl p-hydroxybenzoate, phenoxyethyl ether of decyl p-hydroxybenzoate, phenoxyethyl ether of undecyl p-hydroxybenzoate, and phenoxyethyl ether of dodecyl vanillate.

Further, as the component (c), a compound represented by the following Formula (11) may be used:

[Chem. 11]

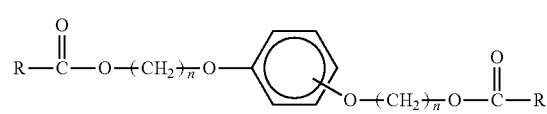

(11)

(wherein R represents a cycloalkyl group having 3 to 8 carbon atoms, or a cycloalkyl alkyl group having 4 to 9 carbon atoms, and n represents an integer of 1 to 3.)

Examples of the compound represented by the Formula (11) include diester of 1,3-bis(2-hydroxyethoxy)benzene and cyclohexanecarboxylic acid, diester of 1,4-bis(2-hydroxyethoxy)benzene and cyclohexanepropionic acid, and diester of 1,3-bis(2-hydroxyethoxy)benzene and cyclohexanepropionic acid.

Furthermore, as the component (c), a compound represented by the following Formula (12) may be used:

[Chem. 12]

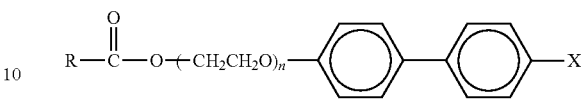

(12)

(wherein R represents an alkyl group having 3 to 17 carbon atoms, a cycloalkyl group having 3 to 8 carbon atoms, or a cycloalkyl alkyl group having 5 to 8 carbon atoms, X represents a hydrogen atom, an alkyl group having 1 to 5 carbon atoms, a methoxy group, an ethoxy group, or a halogen atom, and n represents an integer of 1 to 3.)

Examples of the compound represented by the Formula (12) include diester of 4-phenylphenol ethylene glycol ether and cyclohexanecarboxylic acid, diester of 4-phenylphenol diethylene glycol ether and lauric acid, diester of 4-phenylphenol triethylene glycol ether and cyclohexanecarboxylic acid, diester of 4-phenylphenol ethylene glycol ether and octanoic acid, diester of 4-phenylphenol ethylene glycol ether and nonanoic acid, diester of 4-phenylphenol ethylene glycol ether and decanoic acid, and diester of 4-phenylphenol ethylene glycol ether and myristic acid.

In addition, as (b) the electron-accepting compound, a reversibly thermochromic microcapsule pigment encapsulating a reversibly thermochromic composition of heat color-developing type using a specific alkoxyphenol compound having straight chain or side chain alkyl group having 3 to 18 carbon atoms (JP H11-129623A), a specific hydroxybenzoic ester (JP 2001-105732 A), a gallic ester (JP 2003-253149 A) or the like may be applied.

The reversibly thermochromic composition is a compatible material containing, as essential components, the components (a), (b), and (c), and although the ratio of the components depends on the concentration, discoloration temperature, discoloration mode and kind of each component, in general, the component ratio at which desired characteristics are obtained is the component (b) within the range of from 0.1 to 100, preferably 0.1 to 50, more preferably 0.5 to 20, and the component (c) within the range of preferably from 5 to 200, preferably 5 to 100, more preferably 10 to 100, based on the component (a) 1 (each of the ratios described above is part(s) by mass).

As the microencapsulation, there are known interfacial polymerization, in situ polymerization, submerged coat hardening method, phase separation from aqueous solution, phase separation from organic solvent, melt dispersion cooling method, aerial suspension coating method, spray drying method, and the like. The microencapsulation method is selected as needed, depending on the use purpose. Further, the microcapsule can be put into practical use after further forming a secondary resin coating film on the surface thereof in accordance with the intended use, so as to impart the microcapsule with durability or to modify the surface properties.

In the reversibly thermochromic microcapsule pigment, a mass ratio of the content and the membrane wall is preferably 7:1 to 1:1, and when the mass ratio of the content and the membrane wall is within the above range, it is possible to prevent a deterioration in the color density and vividness during color development. The mass ratio of the content and the membrane wall is more preferably 6:1 to 1:1.

By using the reversibly thermochromic pigment and a non-thermochromic colorant in combination, it is possible to provide a configuration that causes interchangeable color change from a color (1) to a color (2).

As the non-thermochromic colorant, a general pigment or dye is used.

In the composite fiber according to the present invention, the reversibly thermochromic pigment is added in a range of preferably 0.1 to 30% by mass, more preferably 0.5 to 20% by mass, and further preferably 1 to 10% by mass in the core based on the total mass of the composite fiber. If the amount of the reversibly thermochromic pigment is less than 0.1% by mass, it is difficult to obtain a discoloration property and a density suitable for a composite fiber, and it is difficult to sufficiently satisfy a discoloration function. On the other hand, if the amount of the reversibly thermochromic pigment exceeds 30% by mass, it is difficult to recognize a remarkable improvement in discoloration density, dispersion failure is likely to occur at the time of fiber formation, and the spinnability may be deteriorated. In the present invention, if the sheath contains the reversibly thermochromic pigment, it is difficult to obtain desired flame retardancy. Therefore, it is preferable that the reversibly thermochromic pigment be comprised in the sheath to such an extent that the flame retardancy is not impaired, or not comprised in the sheath. Specifically, the amount of the reversibly thermochromic pigment is preferably less than 0.3% by mass, more preferably less than 0.1% by mass, and further preferably 0% by mass based on the total mass of the composite fiber.

Examples of the flame retardant include halogen-based flame retardants, phosphorus-based flame retardants, hydrated metal-based flame retardants, nitrogen-based flame retardants, silicone-based flame retardants, and inorganic flame retardants. If necessary, a flame retardant aid such as an antimony compound can be appropriately used.

Examples of the halogen-based flame retardants include chlorine compounds such as chlorinated paraffin and chlorendic acid, and bromine compounds such as decabromodiphenyl ether, ethylenebistetrabromophthalimide and hexabromobenzene.

Examples of the phosphorus-based flame retardants include phosphorus compounds such as phosphinite compounds, phosphonite compounds, phosphite compounds, phosphinate compounds, phosphonate compounds, phosphoric acid ester compounds, halogen-containing phosphoric acid ester compounds, condensed phosphoric acid ester compounds, phosphoric acid ester amide compounds, and organocyclic phosphorus compounds.

Examples of the hydrated metal-based flame retardants include metal hydroxides such as aluminum hydroxide and magnesium hydroxide.

Examples of the nitrogen-based flame retardants include guanidine compounds, melamine cyanurates, and triazine compounds.

Examples of the silicone-based flame retardants include silicone polymers.

Examples of the inorganic flame retardants include molybdenum compounds, zinc borate, and zinc stannate.

Among these flame retardants, a phosphorus compound is preferable, and one kind or a combination of two or more kinds can be used. Specific examples of phosphorus compounds include trimethyl phosphate, triethyl phosphate, tributyl phosphate, tris(2-ethylhexyl) phosphate, triphenyl phosphate, tricresyl phosphate, trixylenyl phosphate, 2-ethylhexyldiphenyl phosphate, cresil-di-2,6-xylenyl phosphate, resorcinol bis(diphenyl phosphate), bisphenol A bis(diphenyl phosphate), a reaction product of 4,4'-(propane-2,2-diyl) diphenol and diphenylnnethylphosphonate, tris(chloropropyl)phosphate, and tris(tribromoneopentyl)phosphate.

In the examples of the present invention, as a phosphorus-based flame retardant, a phosphorus compound whose mixing ratio of resorcinol bis(diphenyl phosphate): a reaction product of 4,4'-(propane-2,2-diyl)diphenol and diphenylmethylphosphonate was 1:3 was used.

When the flame retardant is added in a range of preferably 1 to 4% by mass in the core and 0.2 to 0.8% by mass in the sheath, more preferably 2 to 4% by mass in the core and 0.4 to 0.8% by mass in the sheath, based on the total mass of the composite fiber, ignition is unlikely to occur, and such excellent flame retardancy that spontaneous extinguishment easily occurs even after once ignition occurs is exhibited. This behavior is most effective when both the resin comprised in the core and the resin comprised in the sheath are polyolefin-based resins.

If the amount of the flame retardant added is less than 1% by mass in the core and less than 0.2% by mass in the sheath, once ignition occurs, flame tends to spread, and it is difficult to obtain desired flame retardancy. Furthermore, if the amount of the flame retardant added exceeds 4% by mass in the core and 0.8% by mass in the sheath, the spinnability is likely to be impaired.

Although the composite fiber according to the present invention is required to include the core and the sheath, that is, to have a two-layer structure, an additional intermediate layer may be provided between the core and the sheath. Such an intermediate layer can have functions such as improving adhesion between the core and the sheath and preventing peeling. An intermediate layer having an intermediate composition between the sheath and the core may be provided so that the composition changes stepwise from a center of the fiber to the outer periphery.

Other additives can be included in the core and sheath. Examples of other additives include dispersants, light stabilizers, fluorescent whitening agents, surfactants, antistatic agents, water repellents, fungicides, insect repellents, plasticizers, and lubricants.

The dispersant is contained in order to improve dispersibility in the resin of the reversibly thermochromic pigment, the flame retardant, the additive, or the like contained in the resin, and examples thereof include waxes. Examples of waxes include paraffin wax, microcrystallin wax, montan wax, polyethylene wax, polypropylene wax, polystyrene wax, low molecular weight polybutene, liquid polybutadiene, liquid polypentadiene, oligoester acrylate, polyamide oligomer, polyester oligomer, tetrafluoroethylene wax, perfluoropolyether, perfluoroolefin oligomer, and silicone oligomer. In the examples of the present invention, polypropylene wax was used as the dispersant.

The light stabilizer is contained in order to prevent photodeterioration of the reversibly thermochromic pigment, and examples thereof include UV absorbers, antioxidants, age resistors, singlet oxygen quenchers, superoxide anion quenchers, ozone quenchers, visible light absorbers, and infrared absorbers.

The amount of the other additives added is more preferably 20% by mass or less, and further preferably 10% by mass or less, based on the total mass of the reversibly thermochromic composite fiber.

The composite fiber according to the present invention can be used for a head ornament, and a head ornament having excellent flame retardancy and high safety can be obtained. The head ornament is not particularly limited, and examples thereof include hair wigs and hair extensions.

The average outer diameter of the composite fiber used for the head ornament is in a range of preferably 30 to 200 µm, and more preferably 60 to 150 µm. If the outer diameter is less than 30 µm, body and bounce are reduced, and texture as human hair is likely to be impaired. On the other hand, when the outer diameter exceeds 200 µm, the feeling tends to be rough, and it is difficult to exhibit hair nature.

The average length of the composite fiber used for the head ornament is preferably 150 to 600 mm, and more preferably 300 to 450 mm.

The composite fiber according to the present invention can be used for a toy, and a toy having excellent flame retardancy and high safety can be obtained. The toy is not particularly limited, and examples thereof include a doll or animal-figured toy having hair or body hair formed from reversibly thermochromic composite fibers, a stuffed animal having body hair formed from reversibly thermochromic composite fibers, and accessories thereof. Here, examples of the accessories include doll hair extensions.

The average outer diameter of the composite fiber used for the toy is in a range of preferably 30 to 200 µm, and more preferably 50 to 120 µm. If the outer diameter is less than 30 pm, the fibers are easily entangled, and the flexibility becomes excessive, so that appearance as a product tends to be spoiled. On the other hand, when the outer diameter exceeds 200 µm, the fiber becomes too thick, and it is difficult to exhibit hair nature.

The average length of the composite fiber used for the toy is preferably 5 to 350 mm, and more preferably 10 to 300 mm The composite fiber according to the present invention is preferably used as artificial hair. The artificial hair can be used as doll hair or as doll and human hair extensions. The artificial hair allows users to enjoy changing the hairstyle in the same way as human hair, and the composite fibers according to the present invention allow users to enjoy color changing when touching by hand, cooling with a water applying tool such as a brush, or heating with hot water or the like. Such a color change can be repeated.

The following can be further exemplified as products using the composite fiber of the present invention.
(1) Clothing:
Outerwears such as T-shirts, sweaters, blouses, dresses, swimsuits, raincoats, and ski wears; footwears such as shoes and shoelaces; personal effects made of cloth, such as towels, handkerchiefs, and wrapping cloths; gloves; neckties; hats; scarves; mufflers; and the like
(2) Interior Ornaments:
Curtains, curtain cords, carpets, rugs, tablecloths, cushions, chair upholstery, seats, mats, and the like (3) Accessories:
False eyelashes, false mustaches, false eyebrows, and the like

EXAMPLES

Examples will be described below; however, the present invention is not restricted thereto.

Preparation of reversibly thermochromic microcapsule pigment

A solution prepared by heating and dissolving a reversibly thermochromic composition composed of 1.0 part of 3,3-bis(4-diethylamino-2-ethoxyphenyl)-4-azaphthalide as the component (a), 5.0 parts of 2,2-bis(4-hydroxyphenyl) hexafluoropropane as the component (b), and 50.0 parts of cyclohexylmethyl stearate as the component (c) and mixing 35.0 parts of aromatic isocyanate prepolymer as a membrane wall material and 40.0 parts of an auxiliary solvent was emulsified and dispersed in an 8% aqueous solution of polyvinyl alcohol and continued to be stirred while being heated. Then, 2.5 parts of water-soluble aliphatic modified amine was added, and further stirring was continued to obtain a microcapsule suspension. The suspension was centrifuged to isolate the reversibly thermochromic microcapsule pigment.

The complete coloring temperature $t_1$ of the reversibly thermochromic microcapsule pigment was 14° C., and the complete decoloring temperature $t_4$ was 38° C. The pigment reversibly changed color from blue to colorless through a change in temperature.

Table 1 below shows the composition of the reversibly thermochromic composite fibers of Examples and Comparative Examples. The numerical values of the composition in the table indicate parts by mass.

TABLE 1

|  | Material Name | Example | | | | | | | Comparative Example | | |
|---|---|---|---|---|---|---|---|---|---|---|---|
|  |  | 1 | 2 | 3 | 4 | 5 | 6 | 7 | 1 | 2 | 3 |
| Core | Reversibly thermochromic microcapsule pigment | 5.0 | 5.0 | 5.0 | 5.0 | 5.0 | 5.0 | 5.0 | 5.0 | 5.0 | 5.0 |
|  | Dispersant | 1.0 | 1.0 | 1.0 | 1.0 | 1.0 | 1.0 | 1.0 | 1.0 | 1.0 | 1.0 |
|  | Phosphorus-based flame retardant | 4.0 | 3.0 | 2.0 | 4.0 | 2.0 | 3.0 | 4.0 | 3.0 | 2.0 | 1.0 |
|  | Non-thermochromic pigment | 0.01 | 0.01 | 0.01 | 0.01 | 0.01 | 0.01 | 0.01 | 0.01 | 0.01 | 0.01 |
|  | Polypropylene-ethylene copolymer | 40.0 | 41.0 | 42.0 | 40.0 | 42.0 | 41.0 | 40.0 | 41.0 | 42.0 | 43.0 |
| Sheath | Phosphorus-based flame retardant | 0.8 | 0.8 | 0.8 | 0.4 | 0.4 | 2.0 | 0.1 |  |  |  |
|  | Polypropylene-ethylene copolymer | 49.2 | 49.2 | 49.2 | 49.6 | 49.6 | 48.0 | 49.9 | 50.0 | 50.0 | 50.0 |

Example 1

Preparation of Reversibly Thermochromic Composite Fiber

The reversibly thermochromic microcapsule pigment described above, a dispersant, a phosphorus-based flame retardant, a pink non-thermochromic pigment, and a polypropylene-ethylene copolymer (melting point 145° C.) were melted and mixed at 200° C. in an extruder according to the formulations shown in Table 1 to obtain a composition constituting a core.

In addition, a phosphorus-based flame retardant and a polypropylene-ethylene copolymer (melting point 145° C.) were melted and mixed at 200° C. in an extruder according to the formulations shown in Table 1 to obtain a composition constituting a sheath.

The composition constituting the core was supplied to an extruder for forming the core, and the composition constituting the sheath was supplied to an extruder for forming the sheath. Using a composite fiber spinning apparatus, spinning was performed at 200° C. from an 18-hole discharge port so that the core : the sheath=5:5 (area ratio), to obtain reversibly thermochromic composite fibers consisting of 18 single yarns having an outer diameter of 90 μm.

The reversibly thermochromic composite fiber reversibly changed to pink at 38° C. or higher and purple at 14° C. or lower, and can retain any of the above colors in a temperature range of 20° C. to 33° C.

The reversibly thermochromic composite fibers of Examples 2 to 7 were obtained in the same manner as in Example 1.

The reversibly thermochromic composite fibers of Examples 2 to 7 reversibly changed to pink at 38° C. or higher and purple at 14° C. or lower, and can retain any of the above colors in a temperature range of 20° C. to 33° C.

Comparative Example 1

Preparation of reversibly thermochromic composite fiber

The reversibly thermochromic microcapsule pigment described above, a dispersant, a phosphorus-based flame retardant, a pink non-thermochromic pigment, and a polypropylene-ethylene copolymer (melting point 145° C.) were melted and mixed at 200° C. in an extruder according to the formulations shown in Table 1 to obtain a composition constituting a core.

In addition, a polypropylene-ethylene copolymer (melting point 145° C.) was melted and mixed at 200° C. in an extruder according to the formulation shown in Table 1 to obtain a composition constituting a sheath.

The composition constituting the core was supplied to an extruder for forming the core, and the composition constituting the sheath was supplied to an extruder for forming the sheath.

Using a composite fiber spinning apparatus, spinning was performed at 200° C. from an 18-hole discharge port so that the core: the sheath=5:5 (area ratio), to obtain reversibly thermochromic composite fibers consisting of 18 single yarns having an outer diameter of 90 μm.

The reversibly thermochromic composite fiber reversibly changed to pink at 38° C. or higher and purple at 14° C. or lower, and can retain any of the above colors in a temperature range of 20° C. to 33° C.

The reversibly thermochromic composite fibers of Comparative Examples 2 and 3 were obtained in the same manner as in Comparative Example 1.

The reversibly thermochromic composite fibers of Comparative Examples 2 and 3 reversibly changed to pink at 38° C. or higher and purple at 14° C. or lower, and can retain any of the above colors in a temperature range of 20° C. to 33° C.

Evaluation of Reversibly Thermochromic Composite Fiber

The flame retardancy and spinnability of the reversibly thermochromic composite fibers obtained from Examples 1 to 7 and Comparative Examples 1 to 3 were evaluated as follows.

The results are shown in Table 2.

Flame Retardancy Test

A test sample was prepared by taping one end of each of 20 reversibly thermochromic composite fibers having a length of 10 cm. A total of 10 test samples were prepared in the same manner. The test sample was held horizontally and ignited with a lighter, and after the ignition of the test sample was confirmed, the lighter was released. When combustion stopped, the test sample was ignited again, and this operation was repeated until combustion was performed 5 cm from an ignition point. This test was similarly performed on 10 test samples. The number of ignitions until the test sample was burned 5 cm was recorded, and according to the number of test samples ignited twice or less, evaluation was performed according to the following criteria.

A: The number of test samples ignited twice or less was 3 or less out of 10.

B: The number of test samples ignited twice or less was 4 to 6 out of 10.

C: The number of test samples ignited twice or less was 7 or more out of 10.

Spinnability Test

The spinnability was evaluated according to the following criteria from a state of thread breakage and nozzle clogging in the production under spinning conditions described in Examples and Comparative Examples.

A: Neither thread breakage nor nozzle clogging occurred, and stable spinning was possible.

B: Although thread breakage and nozzle clogging occasionally occurred, spinning was possible.

C: Thread breakage and nozzle clogging frequently occurred, and stable spinning was not possible.

TABLE 2

| Evaluation | Example | | | | | | | Comparative Example | | |
|---|---|---|---|---|---|---|---|---|---|---|
| | 1 | 2 | 3 | 4 | 5 | 6 | 7 | 1 | 2 | 3 |
| Flame retardancy | A | A | A | A | A | A | B | C | C | C |
| Spinnability | A | A | A | A | A | B | A | A | A | A |

REFERENCE SIGNS LIST $t_1$ Complete coloring temperature
$t_2$ Coloring starting temperature
$t_3$ Decoloring starting temperature
$t_4$ Complete decoloring temperature
ΔH Hysteresis width

The invention claimed is:

1. A sheath-core type reversibly thermochromic composite fiber comprising:
    a core comprising a polyolefin-based resin, a reversibly thermochromic pigment, and a first flame retardant; and
    a sheath comprising a polyolefin-based resin and a second flame retardant, wherein the first flame retardant is a phosphorus compound, and the second flame retardant is a phosphorous compound, and wherein the core comprises 2 to 4% by mass of the first flame retardant based on the total mass of the reversibly thermochromic composite fiber, and the sheath comprises 0.4 to 0.8% by mass of the second flame retardant based on the total mass of the reversibly thermochromic composite fiber.

2. The reversibly thermochromic composite fiber according to claim 1, wherein an average outer diameter of the reversibly thermochromic composite fiber is 10 to 300 μm.

3. The reversibly thermochromic composite fiber according to claim 1, wherein an average length of the reversibly thermochromic composite fiber is 5 to 600 mm.

4. The reversibly thermochromic composite fiber according to claim 1, wherein an area ratio of the core: the sheath in a cross section of the reversibly thermochromic composite fiber is 4:6 to 7:3.

5. A head ornament comprising the reversibly thermochromic composite fiber according to claim 1.

6. The head ornament according to claim 5, wherein the head ornament is a hair wig or a hair extension.

7. A toy comprising the reversibly thermochromic composite fiber according to claim 1.

8. The toy according to claim 7, wherein the toy is a doll, an animal-figured toy, a stuffed animal, or an accessory thereof.

* * * * *